United States Patent [19]
Massicott et al.

[11] Patent Number: 5,991,068
[45] Date of Patent: Nov. 23, 1999

[54] GAIN CONTROLLED OPTICAL FIBRE AMPLIFIER

[75] Inventors: Jennifer Massicott; Richard Wyatt, both of Suffolk, United Kingdom

[73] Assignee: British Telecommunications public limited company, London, United Kingdom

[21] Appl. No.: 08/693,049

[22] PCT Filed: Feb. 20, 1995

[86] PCT No.: PCT/GB95/00346

§ 371 Date: Oct. 21, 1996

§ 102(e) Date: Oct. 21, 1996

[87] PCT Pub. No.: WO95/22847

PCT Pub. Date: Aug. 24, 1995

[30] Foreign Application Priority Data

Feb. 18, 1994 [EP] European Pat. Off. .............. 94301184

[51] Int. Cl.⁶ .................................................. H01S 3/06
[52] U.S. Cl. ........................ 359/337; 359/341; 359/346; 372/6; 372/33
[58] Field of Search .................................. 359/337, 341, 359/346; 372/6, 33

[56] References Cited

U.S. PATENT DOCUMENTS

| 5,088,095 | 2/1992 | Zirngibl . |
| 5,128,800 | 7/1992 | Zirngibl . |
| 5,155,780 | 10/1992 | Zirngibl . |
| 5,239,607 | 8/1993 | da Silva et al. . |

FOREIGN PATENT DOCUMENTS

| 0497491A2 | 8/1992 | European Pat. Off. . |
| 0519648A2 | 12/1992 | European Pat. Off. . |
| 9522847 | 8/1995 | WIPO . |

OTHER PUBLICATIONS

"Gain Control in Erbium–Doped Fibre Amplifiers by Lasing at 1480nm with Photoinduced Bragg Gratings Written on Fibre Ends", Delevaque et al, Electronics Letters, Jun. 10, 1993, vol. 29 No. 12.

"Automatic Optical Loss Compenstion with Erbium–Doped Fiber Amplifier", Okamura, Journal of Lightwave Technology, Aug. 10, 1992, No. 8.

"Wavelength Flattened Saturated Erbium Amplifier using Multiple Side–Tap Bragg Gratings", Kashyap, Wyatt and McKee, Electronics Letters, May 27, 1993, vol. 29, No. 11.

High Output Power from an Efficient Praseodymium–Doped Fluoride Fiber Amplifier, Whitley, Wyatt, Szebesta and Davey, IEEE Photonoics Technology Letters Apr. 5, 1993, No. 4.

"1480nm Pumped Erbium Doped Fibre Amplifier with all Optical Automatic Gain Control", Massicott et al, Electronics Letters, Jun. 9, 1994, vol. 30, No. 12.

(List continued on next page.)

*Primary Examiner*—Nelson Moskowitz
*Attorney, Agent, or Firm*—Nixon & Vanderhye P.C.

[57] ABSTRACT

In a gain-controlled erbium-doped optical amplifier, gain control is achieved by clamping the gain of a laser cavity to be equal to the overall cavity loss and by fixing the resonant wavelength of the amplifier to be at a first wavelength. When an optical signal to be amplified having a second wavelength different from the first wavelength passes through the amplifier the gain experienced by the signal depends entirely on the gain of the cavity, and not on the intensity of the signal. If the first wavelength is arranged to be at the peak of the sum of the absorption and emission cross sections of erbium, the amplifier exhibits minimum sensitivity to ambient changes in temperature.

26 Claims, 6 Drawing Sheets

OTHER PUBLICATIONS

"Gain Control in Erbium–Doped Fibre Amplifiers by an All–Optical Feedback Loop", Zirngibl, Electronics Letters Mar. 28, 1991, vol. 27, No. 7.

"All–Optical Remote Gain Switching in Er–Doped Fibre Amplifiers", Zirngibl, Electronics Letters Jun. 20, 1991, vol. 27, No. 13.

"An Optical Power Equalizer Based on One Er–Doped Fiber Amplifier", Zirngibl, IEEE Photonics Technology Letters, vol. 4, No. 4, Apr. 1992.

Massicott et al, OSA Trends in Optics and Photonics, vol. 5, pp. 97–100, Jul. 13, 1996; abst. only herewith.

Massicott et al, Electronics Letters, vol. 32, #9, pp. 816–817, Apr. 25, 1996; abst. only herewith.

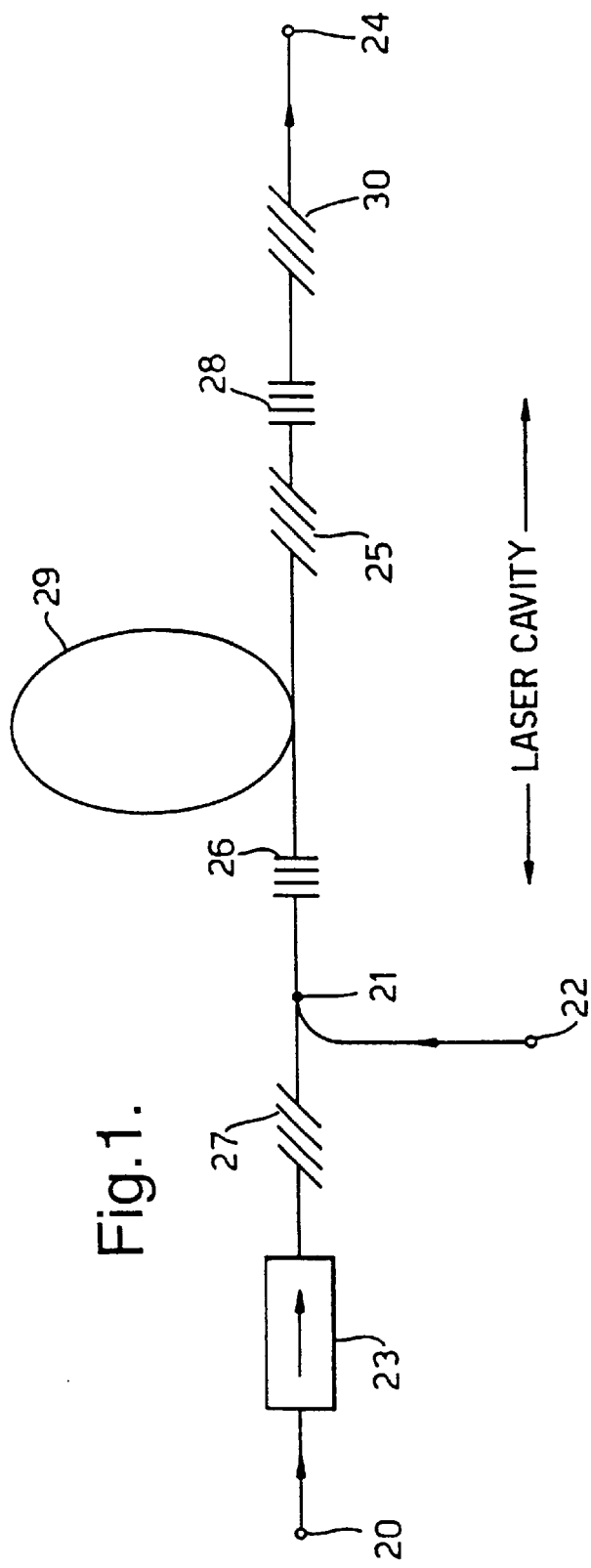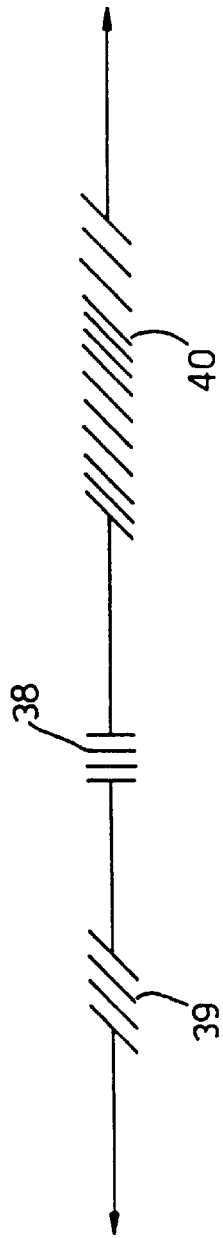

|||| REFLECTION GRATING AT LASER WAVELENGTH

//// SIDE TAP GRATING AT LASER WAVELENGTH

SIDE TAP GRATINGS FOR GAIN EQUALISATION CAN BE ADDED ANYWHERE WITHIN OR AFTER THE GAIN MEDIUM

RING LASER CONFIGURATIONS

GAIN CONTROLLED OPTICAL FIBRE AMPLIFIER

BACKGROUND OF THE INVENTION

1. Field of the Invention

This invention relates to optical amplifiers and, in particular, but not exclusively, to a rare earth doped fibre amplifier with improved operating characteristics.

2. Related Art

Rare earth doped optical fibre amplifiers are ideal as repeaters, pre-amplifiers or the like in optical communication systems. The desirable features of such amplifiers include low noise operation, polarisation insensitivity and low insertion loss. One particular advantage derived from using rare earth dopants is that they typically exhibit sharp spectral features. In contrast, transition metal ion-doped media exhibit very broad absorption and fluorescence features. Of the rare earth dopants, erbium, when used as a dopant in silica fibre, has lasing properties in the desirable 1550 nm window for optical communications, and similarly, praseodymium operates in the desirable 1300 nm window. For convenience only, erbium and praseodymium doped silica fibres will be referred to in the following description, although it is emphasised that the description applies equally as well to other rare earth dopant species and host configurations.

The relatively long fluorescence lifetime of the upper state of the amplifying transition in erbium, compared with for example semiconductor laser transitions, has many important implications. One implication is that electrical noise on the bias supply to a semiconductor pump laser used to pump an erbium doped fibre amplifier introduces a degree of modulation on the gain of the amplifier at low frequencies of pump noise components below 100 KHz. Therefore, electrical bias supplies for pump lasers need to be noise free at these low frequencies at least. Another implication is that the propagation of a signal through an erbium doped fibre amplifier can cause modification of the population inversion and therefore a modification of the amplifier gain for its own and other wavelengths. This effect is particularly marked for pulses that are sufficiently intense to saturate the gain. Severe pulse shaping can occur as a result of this process.

In multi-wavelength multiplexed transmission, for example wavelength division multiplexed (WDM) systems, modulation of the amplifier gain by one of the multiplexed signals can result in low frequency crosstalk effects on the other signals. These effects are particularly significant, where the transient effects associated with turning channels off and on can seriously disrupt other wavelengths. This effect can be eliminated if the amplifier's gain, and hence gain spectrum, is controlled independently of input signal level.

Known systems for implementing independent amplifier gain control use automatic gain control (AGC) in the form of opto-electronic or all optical feedback loops, where the all-optical option is more desirable in terms of reduced complexity and cost. Also, opto-electronic feedback loops suffer with limited speed of response and potential degradation of the amplifier noise response.

One method of making an amplifier gain independent of input signal using an all-optical feedback loop has been proposed in European Patent Application 92300519.3. The method describes a semiconductor pumped erbium doped fibre amplifier (EDFA) which has coupled to it an optical feedback loop which couples the output of the amplifier to the input of the amplifier. A narrow bandwidth filter coupled to the feedback loop allows selected control wavelengths of the amplified spontaneous emission to pass from the output of the fibre amplifier to the input of the fibre amplifier. The feedback signal has a control wavelength which is different from that of the pump and the wavelengths of the signals to be amplified. The feedback control signal in effect locks the amplifier in a ring laser configuration. Thus, lasing conditions are controlled by the wavelength of the feedback control signal and the attenuation in the feedback loop, and not the input power of the pump or signal wavelengths. The ring laser configuration necessitates the use of a wavelength selective coupler (WSC) and three 3 dB couplers or alternatively three WSCs, which, in terms of manufacture, is a complex arrangement.

An alternative arrangement is proposed in "Gain control in erbium-doped fibre amplifiers by lasing at 1480 nm with photoinduced Bragg gratings written on fibre ends", Delevaque et al., Electronic Letters, June 10th, Vol 29, no. 12. The arrangement involves writing Bragg reflectors at a control wavelength at both fibre ends of an EDFA, there being no intrinsic loss mechanism for the signal except for the reflectors and for coupling losses due to fusion splicing.

SUMMARY OF THE INVENTION

In accordance with a first aspect, the present invention provides an optical amplifier comprising:

an optical cavity defined by first and second reflection means, the optical cavity incorporating a gain medium comprising an optical fibre host including a rare earth dopant species and being tuned for resonance at a first wavelength;

means for coupling an optical signal into the cavity at a second wavelength different from the first wavelength;

means for coupling the optical signal, after amplification, from the cavity; and pump means for optically pumping the gain medium to provide a population inversion, characterised in that the optical cavity is arranged to provide an asymmetric laser flux distribution along its length, and in that one of the first or second wavelengths is substantially equal to the wavelength of the peak of the sum of the absorption and emission cross-sections of the dopant species.

Emission and absorption characteristics of the rare earth elements have been investigated in some depth and it is known which of the elements (or ions thereof) exhibit potential as dopant species in silica based or fluoride based optical fibres (see reference [1]).

As will be described in more detail below, the applicants have determined that cavity sensitivity to ambient changes, for example in temperature, can be minimised, by placing the resonant wavelength of the cavity near to the peak of the sum of the absorption and emission cross-sections of the dopant species.

For erbium, as the dopant species, the applicants have determined that it is possible and desirable to place the resonant cavity wavelength substantially at the peak of around 1530 nm, since the signal wavelength can be anywhere in between about 1500 nm and 1600 nm.

For praseodymium, the peak of the sum of the absorption and emission cross-sections and the optimum signal transmission wavelength of around 1300 nm substantially coincide, so it is not normally possible to position the resonant wavelength at the peak in this case as it is necessary for the signal wavelength and the resonant wavelength to be different. However, even if the signal wavelength is at the peak, it is possible to design the cavity to resonate at a wavelength very close to the peak.

Advantageously, the use of erbium supports lasing and thus amplification in the important 1550 nm window for silica fibre optical communications, and the use of praseodymium supports lasing and thus amplification in the important 1300 nm window for silica fibre optical communications. Other dopant species and host arrangements produce gain in various other wavelength ranges of interest. For example, neodymium has been seen to exhibit potential for operation in the 1300 nm window and thulium has been seen to exhibit potential for operation in the 1500 nm window [1].

There are several configurations of input port, output port and pump arrangement which can achieve the desired effect. The input signal to be amplified or the amplified output signal can be either coupled into the cavity directly, or through the first or second reflector into the cavity. Similarly, the pump source can be coupled to the cavity directly or through either the first or second reflectors. It is clear that whichever arrangement is chosen, suitable couplers and reflectors need to be incorporated.

Preferably, in an optical amplifier according to the present invention, the pump is combined with the input signal to be amplified by a wavelength division multiplexer (WDM) and subsequently the combined signal is coupled into the optical cavity through the first reflector.

The lasing wavelength of the optical cavity is fixed by the reflectors which force lasing at the required wavelength. Typically the reflectors are optical gratings written into the core of fibre either side of the fibre amplifier by known methods. One method is described in detail in Kashyap et al., Electronic Letters, page 730–731, May 24, 1990, Vol 26, no. 11, the contents of which are incorporated herein by reference. Optical gratings can have highly wavelength specific reflectivity and, unlike mirrors, gratings can be easily and robustly incorporated into optical fibres and optical fibre systems.

The pump means provides energy to optically pump the laser cavity. For continuous, reliable pumping, the pump source can be a high power semiconductor diode laser typically using an MQW structure, operating at 1480 nm or 980 nm when erbium is the rare earth dopant. It is possible to pump erbium ions with other wavelengths of pump, for example, 807 nm. However, the 807 nm pump can suffer with reduction of efficiency due to excited state absorption. Of the 1480 nm and 980 nm pump options, 1480 nm is preferred since at 1480 nm single mode transmission is possible in standard 1550 nm fibre. However, there would be few-moded operation at 980 nm in standard 1550 nm fibre, which results in less efficient use of pump power.

In a preferred embodiment of the present invention, a side-tap grating is incorporated in the fibre between the first and second reflectors, close to the second reflector. The grating acts to couple a portion of the light at the lasing wavelength into the cladding of the fibre. Thus, wavelength specific attenuation is incorporated into the optical cavity and the first and second reflectors can both be highly reflecting at the lasing wavelength. The reflectors, being highly reflecting, also prevent stray light at the lasing wavelength getting into the cavity from outside.

In a further embodiment, side tap gratings are added externally to either side of the cavity. This is a useful improvement as even highly reflective gratings in a fibre may be only about 95% reflective. The further side tap gratings are able to attenuate the remaining light at the laser wavelength, which would otherwise escape from the laser cavity into the network fibre cladding.

Unlike the system proposed by Delevaque et al., the present amplifier has control parameters optimised for operation in the 1550 nm window of optical communications for erbium or for operation in the 1300 nm window for praseodymium. A full analysis of the nature of one particular example of an erbium doped fibre amplifier is presented, which enables optimum values for lasing wavelengths and losses for specific signal gains to be applied. The skilled person will appreciate that the analysis, although based on an erbium doped AlGe:silica fibre amplifier, is applicable to other rare earth dopant species and host configurations.

BRIEF DESCRIPTION OF THE DRAWINGS

Embodiments of the invention will now be described by way of example only with reference to the accompanying drawings in which:

FIG. 1 is a representation of an embodiment of the present amplifier;

FIG. 3 is a graph representing the transient response of the present amplifier to an input signal being switched on;

FIG. 8 is an example of a replaceable fibre grating unit; and

DETAILED DESCRIPTION OF EXEMPLARY EMBODIMENTS

Figure 2:
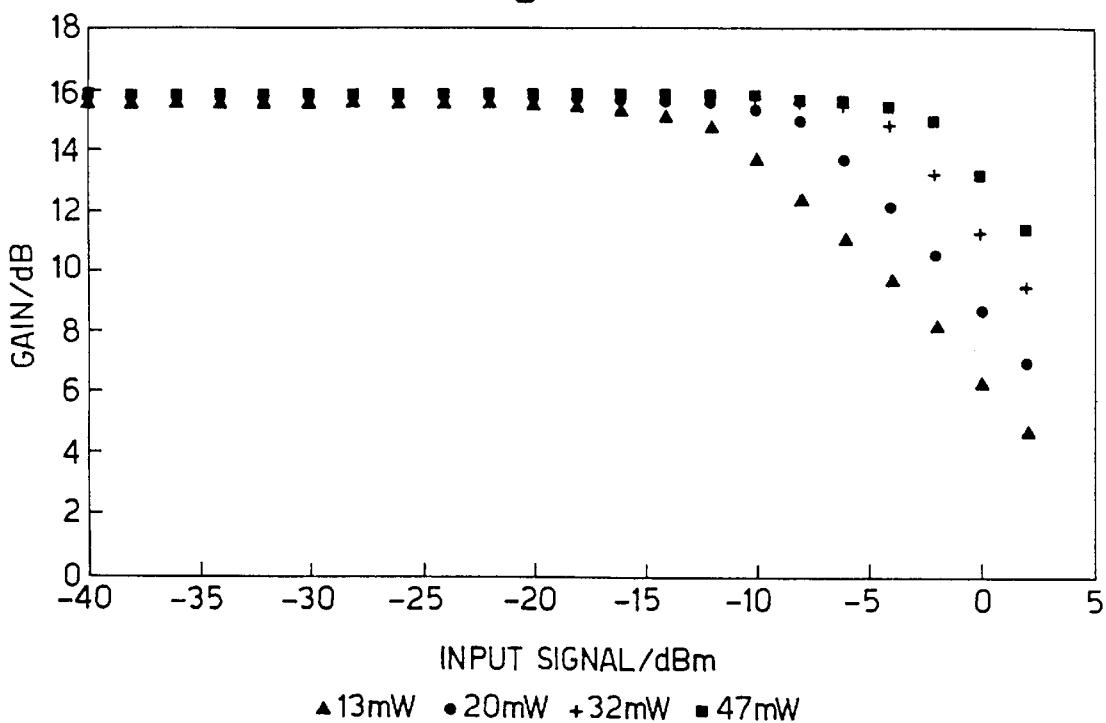
FIG. 2 is a graph representing amplifier gain against input signal level for various pump powers.

FIG. 1 illustrates an embodiment of the present invention. For amplification in the 1550 nm optical communication window, an erbium doped fibre amplifier 29 provides the optical gain medium for a laser cavity, the cavity being defined by a first optical grating 26 and a second optical grating 28, the first and second optical gratings being highly reflective at the required lasing wavelength, and highly transmitting at other wavelengths, particularly the pump and input signal wavelengths. In this embodiment they define the lasing wavelength of the cavity at 1520 nm. A WDM 21 combines a pump at 1480 nm, which is input at port 22, with a 1550 nm input signal, which is input at port 20, to be amplified. The combined signal subsequently couples into the optical cavity through the first optical grating 26. In gain controlled operation, the gain of the laser cavity at the lasing wavelength equals the loss of the laser cavity and is neither affected by the data signal level at a wavelength different from the lasing wavelength or the pump power level. The amplified data signal at 1550 nm exits the amplifier through the second optical grating 28 and is output from an output port 24.

In FIG. 1 the embodiment also includes isolator 23 which prevents stray reflections and amplified spontaneous emission (ASE) from the amplifier travelling backwards and possibly interfering with previous amplifier stages.

The side-tap grating 25, in operation, acts to couple a portion of the light at the lasing wavelength into the cladding of the optical fibre. This partial reflection provides the necessary loss for stable laser action. The provision of a suitable level of loss means that both optical gratings 26 and 28 can be, and preferably are, high reflectors at the lasing wavelength.

Highly reflective gratings 26 and 28 are placed around the erbium doped fibre amplifier to provide optical feedback, to form a laser cavity. Under lasing conditions, the amplifier's gain at the lasing wavelength is determined by the cavity losses. Assuming that the amplifying medium is homogeneously broadened, which is a very good approximation for erbium in AlGe:silica fibre at room temperature, clamping the available gain at one wavelength defines the gain at all other wavelengths within the gain spectrum. The gratings 26 and 28, which are written into the core of the optical fibres either side of the erbium doped fibre amplifier, are used as feedback elements for three primary reasons. Firstly, because this enables the amplifier to be an all fibre device, which is advantageous in terms of avoiding alignment problems and costs. Secondly, the gratings can have a relatively narrow reflection spectrum to define the lasing wavelength very precisely, and hence the inversion of the optical amplifier is clamped at a precise level also. This is of importance because, even for the same cavity loss, different lasing wavelengths will give rise to different net inversions, and hence different gains at other wavelengths. Thirdly, the level of out-of-band reflection and loss from photosensitive gratings is extremely low, and this is of great importance for the stable operation of the amplifier.

To ensure that the noise performance of the amplifier is degraded as little as possible, it is necessary to minimise the power of the control wavelength at the input end of the amplifier laser cavity, so that the level of local inversion is not overly reduced at this point. This is achieved by making the control cavity asymmetric, such that the reflector near the input is close to unity, with the output reflector or the side-tap grating and high reflector combination chosen to give the appropriate value of controlled gain. In a practical implementation, it may also be necessary to include further side-tap gratings 27 and 30, or some other source of loss at the lasing wavelength, outside of the laser cavity to further reject the residual laser power, to avoid downstream interference elsewhere in the system. The basic performance of a controlled amplifier according to the present invention is shown in FIG. 2 which shows how amplifier gain varies with input power for various levels of pump.

FIG. 2 shows a typical erbium doped silica fibre gain controlled amplifier characteristic. In this case, the amplifier consisted of 25 m of fibre, which was erbium in $SiO_2$—$Al_2O_3$—$GeO_2$—$P_2O_5$ host glass with a refractive index difference of 0.013, an $LP_{01}$ mode cut off of 1.2 μm, a core diameter of 5.3 μm and an $Er^{3+}$ concentration such that the peak absorption at 1532 nm was 6.1 dB/m at room temperature. It was assumed that the amplifying medium was homogeneously broadened which is a very good first order approximation. The graph shows that the controlled signal gain level is 16 dB for a signal level up to about −10 dBm, when the pump power was above 20 mW. Below 13 mW, the amplifier was out of the controlled region because the net population inversion provided by the pump was not sufficient to provide enough gain to maintain lasing at the laser wavelength.

For a pump power of 47 mW it can be seen from the graph that the gain remains within 1 dB of that required (16 dB) up to about −2 dBm input power, with <0.2 dB variation over the majority of the range.

Without gain control, at this level of pump power (47 mW), the small signal gain (i.e. a gain which has negligible effect on the level of inversion) of an uncontrolled amplifier would be around 30 dB or so. This indicates that the gain control scheme according to the present invention is remarkably effective in keeping the gain constant over a wide range of input power levels.

There is also seen to be an advantage of relative insensitivity to pump power variation within the limits of the controlled regions. From the graph it can be seen that this is true for input signal levels less than −10 dBm, for the 20 mW to 47 mW curves.

Practically, useful controlled signal gains are likely to be between approximately 10 dB and 25 dB gain at around 1550 nm. However control is equally possible at other gains. The limits on the laser wavelengths are dictated by whether there is enough gain available to appropriately saturate the device. This is discussed below for a particular example and it is shown that, to obtain 16 dB signal gain, for example, the laser wavelength must be longer than about 1510 nm for the given amplifier.

Figure 3:
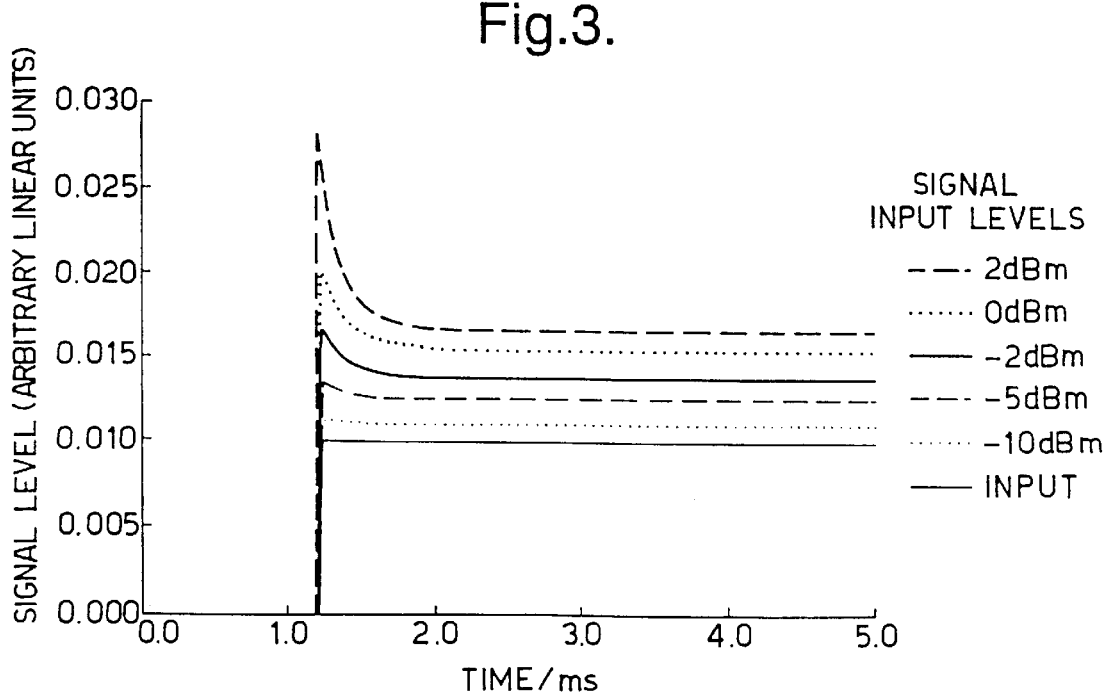

Another measure of the effectiveness of the gain control mechanism is to look at the response of the amplifier to a transient in the input signal. FIG. 3 shows the response when the input data signal was simply turned off and then on. In the graph there is shown the input signal for reference, together with several traces taken with different input levels from −10 dBm, to +2 dBm. The relative levels of the traces are adjusted for convenience in viewing. The controlled trace follows the input very closely, while the others, which are outside the controlled region, show varying degrees of overshoot. Without the control, the −10 dBm signal would show considerable overshoot. It is this overshoot which leads to transient saturation in uncontrolled fibre amplifiers.

In practice, it is important for a gain controlled amplifier according to the present invention to be optimised. Two of the parameters which can be optimised are cavity loss and laser wavelength. In assessing the potential use of the gain controlled amplifier, it is also necessary to assess its sensitivity to environmental changes and construction parameters. The present invention enables the optimisation of gain controlled lasers, particularly with regard to stability and lack of sensitivity to ambient changes.

The gain of the amplifier in the controlled region is not dependent on pump power and signal power but is determined solely by the laser cavity parameters. Changes in the cavity loss (equivalent in steady state to the gain at the laser wavelength) and the lasing wavelength, change the population inversion in the doped fibre and hence the gain at other wavelengths across the amplifying bandwidth. Changes in the temperature of the gain medium also slightly affect both the laser gain and the relationship of the laser gain with the gain at other wavelengths.

Changes to the cavity loss may occur due to long-term degradation of the fibre or grating reflectors or, on shorter timescales, as a result of temperature variations which may detune the two grating reflection peaks away from one another. The change in gain, $g_s$, at the signal wavelength caused by a change in the laser cavity loss γ is given by:

$$\frac{dg_S}{d\gamma} = \frac{\sigma_{as} + \sigma_{es}}{\sigma_{al} + \sigma_{el}} = \frac{\sigma_{as}}{\sigma_{al}} R \qquad \text{EQUATION 1}$$

where $$R = \frac{\left(1 - e^{\frac{h}{kT}(v_o - v_s)}\right)}{\left(1 + e^{\frac{h}{kT}(v_o - v_l)}\right)}$$

where:
- γ is the single pass cavity loss (=$g_l$, gain at laser wavelength),
- $N_t$ is the dopant ionic density,
- $\sigma_{al}$, $\sigma_{as}$ are the absorption cross-sections at the laser and signal wavelengths,
- $\sigma_{el}$, $\sigma_{es}$ = the emission cross-sections at the laser and signal wavelengths,
- $v_l$ and $v_s$ = the laser and signal frequencies,
- $v_o$ = the frequency for which the absorption and emission cross-sections are equal,
- h=Plank's constant,
- K=Boltzman's constant,
- T=temperature in Kelvin.

For gain stabilised operation in the amplifier according to the invention, there must be sufficient gain at the laser cavity wavelength for lasing to occur. Once lasing, the saturation due to the laser flux in the cavity forces the overall gain at the laser wavelength (two pass) to equal the total cavity loss (two pass). The cavity loss is chosen in accordance with the cavity wavelength in such a way that the required gain at the signal wavelength is obtained. In the paper by Delevaque et al., the amplifier proposed has a laser wavelength which is in part of the spectrum where there is very little gain for quite a high population inversion. Thus, it is apparent to the applicants that it is not possible to reduce the cavity losses of this amplifier by very much, and even if it were possible to reduce the losses to zero, the maximum possible inversion would still be around 65% with very little gain suppression. As a result it would not be possible to increase the gain controlled signal input by much without lasing stopping.

The gain of an amplifier according to the present invention is determined by the gain in operation at the laser wavelength as the gain medium of the amplifier is essentially homogeneous. As long as there is a lasing flux, the gain at the laser wavelength is fixed equal to the laser cavity loss. Power changes in the laser flux compensate for the signal power level changes. If the signal power exceeds a critical level, it will reduce the inversion below the level necessary to maintain laser operation. At this point, the gain at the laser wavelength falls below the level maintained by the laser cavity loss and lasing stops. For signal power levels greater than this critical level, the amplifier performance becomes that of an equivalent uncontrolled device.

Figure 5:
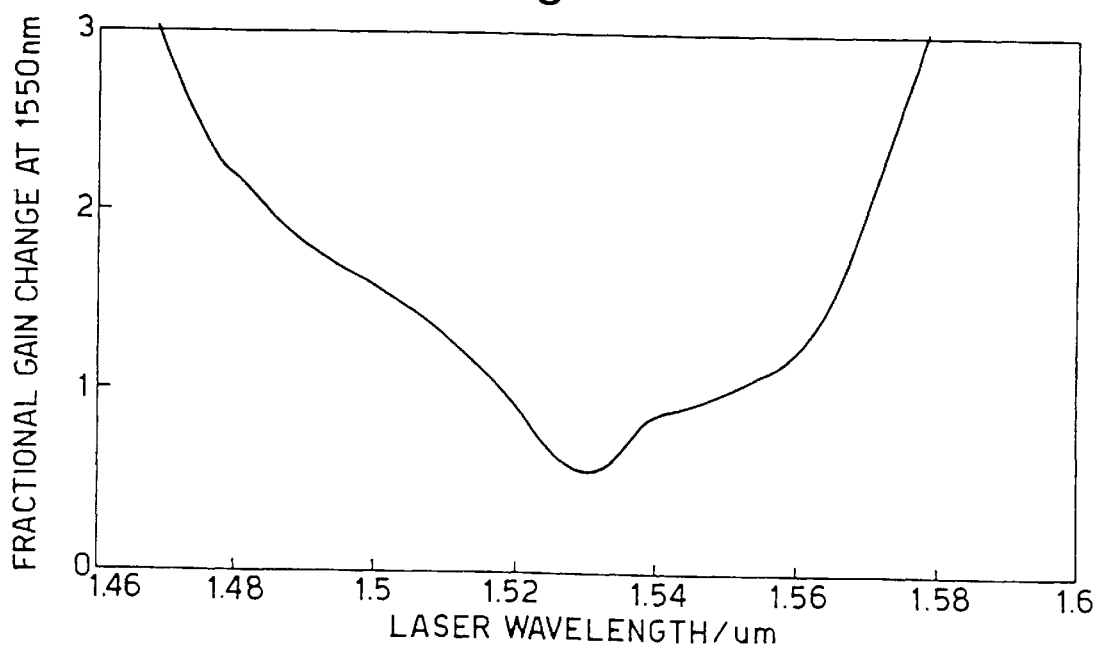
FIG. 5 is a graph representing change in gain for an input signal wavelength of 1550 nm against varying lasing wavelengths of operation.

Using measured absorption cross-section data, $dg_s/d\gamma$ is plotted as shown in FIG. 5. The graph in FIG. 5 shows that for a gain controlled amplifier in which the laser wavelength is 1480 nm, such as that proposed by Delevaque, a change in cavity loss of 0.1 dB would result in a change of 0.22 dB in the gain of a 1550 nm signal. The same change in cavity loss for a laser wavelength of 1530 nm results in only a 0.055 dB change in signal gain. It is clear from the graph that laser operation at 1520 nm (as in our example above) is not the optimum wavelength of operation, although it is clearly much better than 1480 nm, however, it is clear from the results presented what the optimum ranges of operation are.

It is clear from the foregoing that it is highly advantageous to operate the laser as close to the peak of the sum of the emission and absorption cross-sections as possible. As shown in FIG. 5, for erbium doped AlGe:silica fibre, this is between 1.52 μm and 1.55 μm.

In terms of optimising laser wavelength, for a laser cavity with a gain, $g_l$, the gain at the signal wavelength, $g_s$, is given by $$g_S = \frac{\sigma_{as}}{\sigma_{al}} R\gamma + \sigma_{as} N_t (R - 1) \qquad \text{EQUATION 2}$$

where $N_t$ is the ionic density of the dopant.

Density of erbium ions in the silica fibre host can be calculated from the peak absorption of the fibre, its peak absorption cross-section, its length, the overlap between the peak wavelength mode and the radial distribution of the ions in the fibre core. The figure used in our calculations is $3 \times 10^{25}$ ions/m$^3$.

Figure 6:
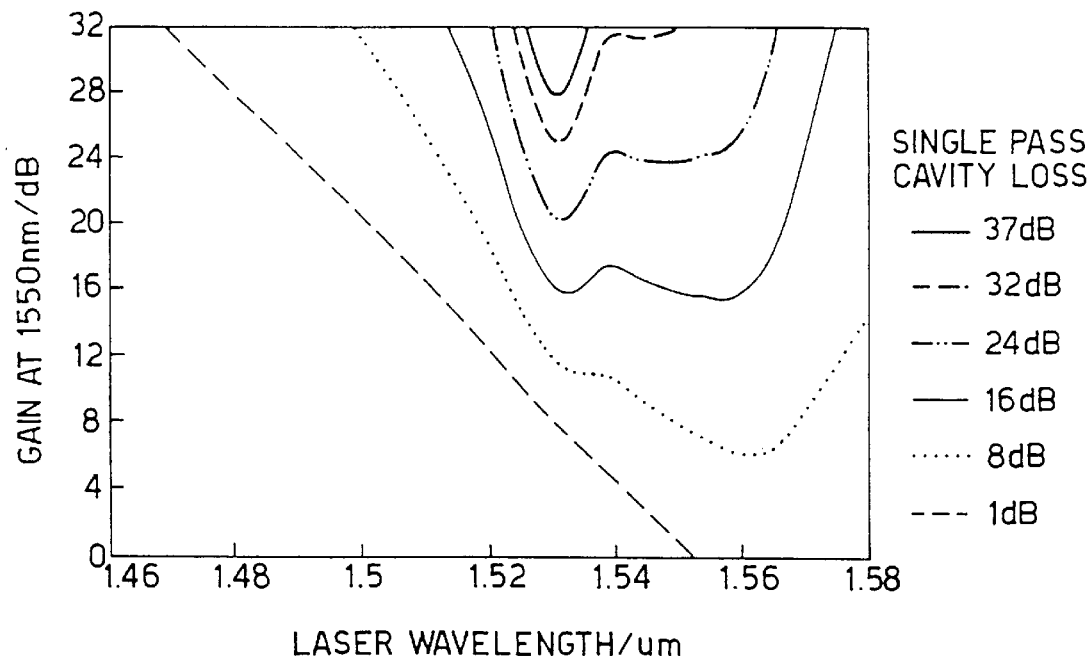
FIG. 6 is a graph representing gain at an input signal wavelength of 1550 nm against lasing wavelength for varying values of single pass cavity loss.

FIG. 6 shows $g_s$ plotted for laser cavity losses between 1 and 37 dB. The turning points in the curves give the laser wavelengths at which any changes in laser wavelength result in minimum change in signal gain. The expected gains are plotted as a function of single pass cavity loss. From this graph, it is possible to compare the sensitivities of amplifiers set up with similar gains but having different lasing wavelengths. For example, in the case of an amplifier operating at a signal gain of 28 dB, pumped at 980 nm and lasing at 1480 nm, the gain changes by 0.7 dB for a 1 nm shift in laser wavelength. In comparison, an amplifier pumped at 1480 nm in which the lasing wavelength is 1531 nm changes in signal gain by 0.25 dB for the same 1 nm shift in laser wavelength. A device operating at a lower signal gain of 16 dB, for example, varies in signal gain by less than 0.1 dB for the 1 nm laser wavelength shift.

From the differential of Equation 2, it is possible to extract the laser wavelength for which an amplifier operating at any particular gain will be wavelength-insensitive. The differential can be expressed as $$\frac{dg_s}{dv_l} = \sigma_{as} R \left[ \frac{h}{kT} \left( \frac{g_l}{\sigma_{al}} + N_t \right) Z_{l(v)} - \frac{g_l}{\sigma_{al}^2} \frac{d\sigma_{al}}{dv_l} \right] \qquad \text{EQUATION 3}$$

where $$Z_l(v) = \frac{e^{\frac{h}{kT}(v_o - v_l)}}{\left(1 + e^{\frac{h}{kT}(v_o - v_l)}\right)}$$

Figure 7:
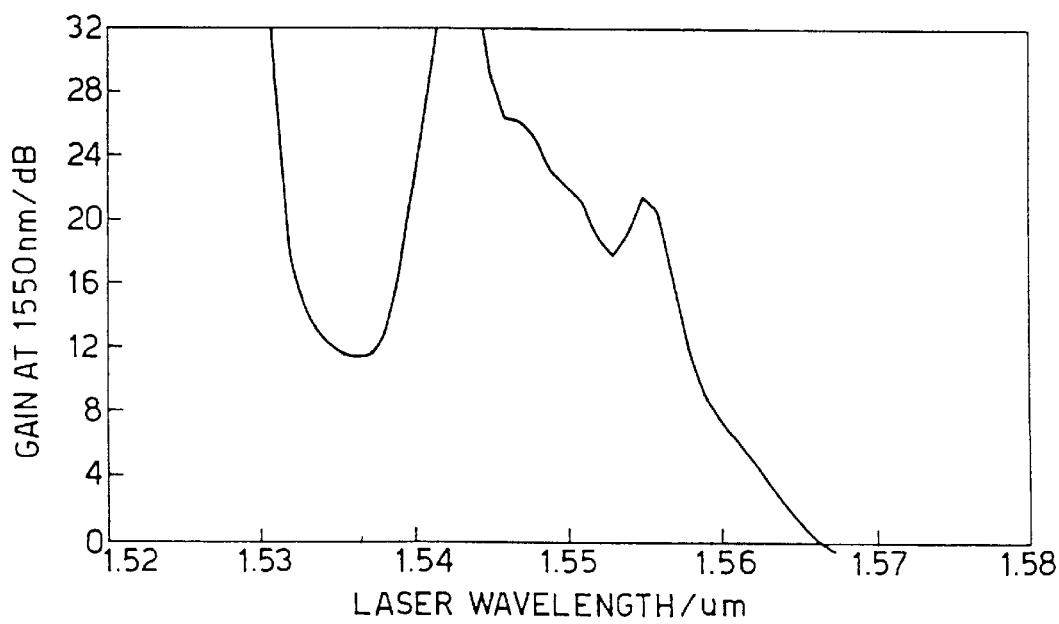
FIG. 7 is a graph representing gain at an input signal wavelength of 1550 nm against lasing wavelength when optimised to reduce the effect of lasing wavelength shifts.
Figure 9A:
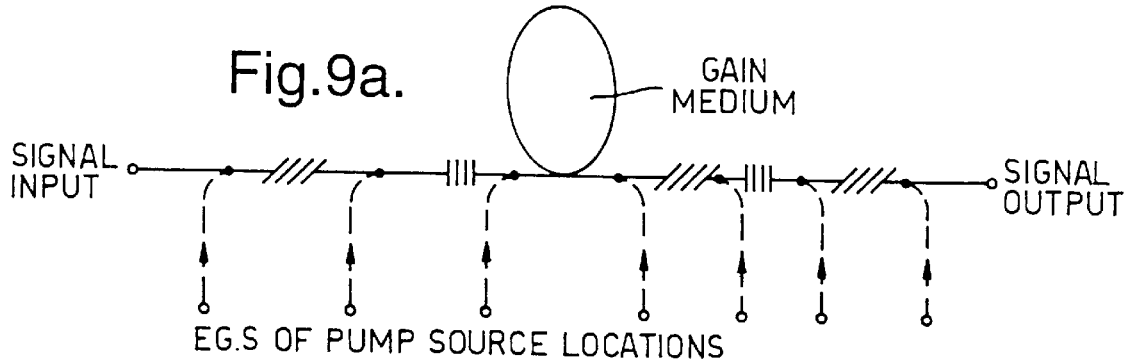
FIG. 9 represents further embodiments of the present invention.
Figure 9B:
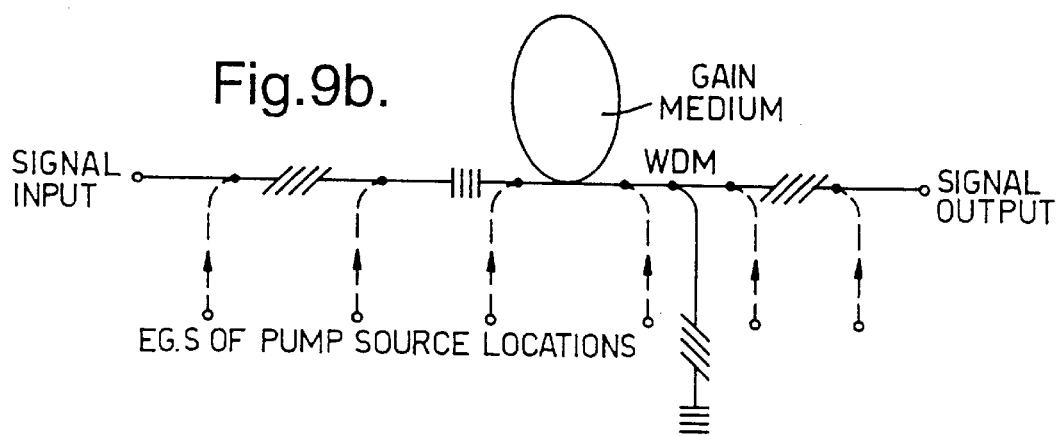
Figure 9C:
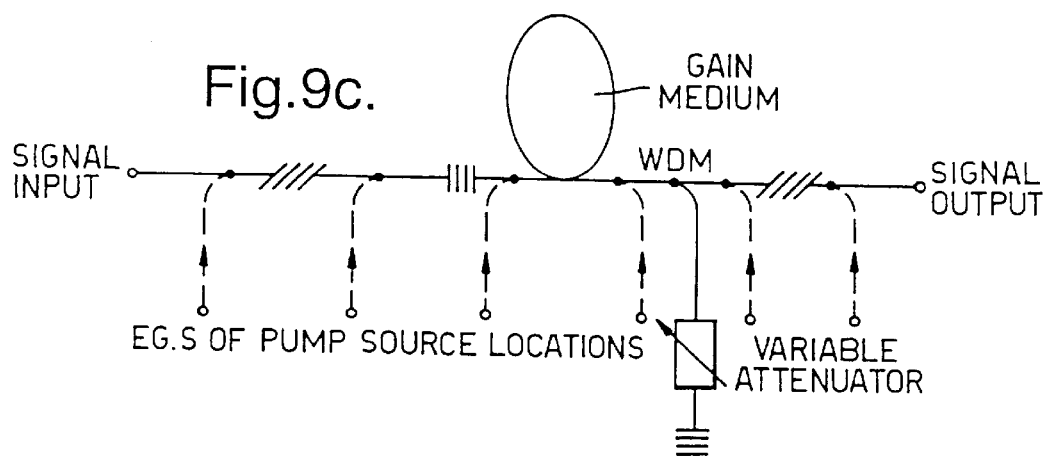
Figure 9D:
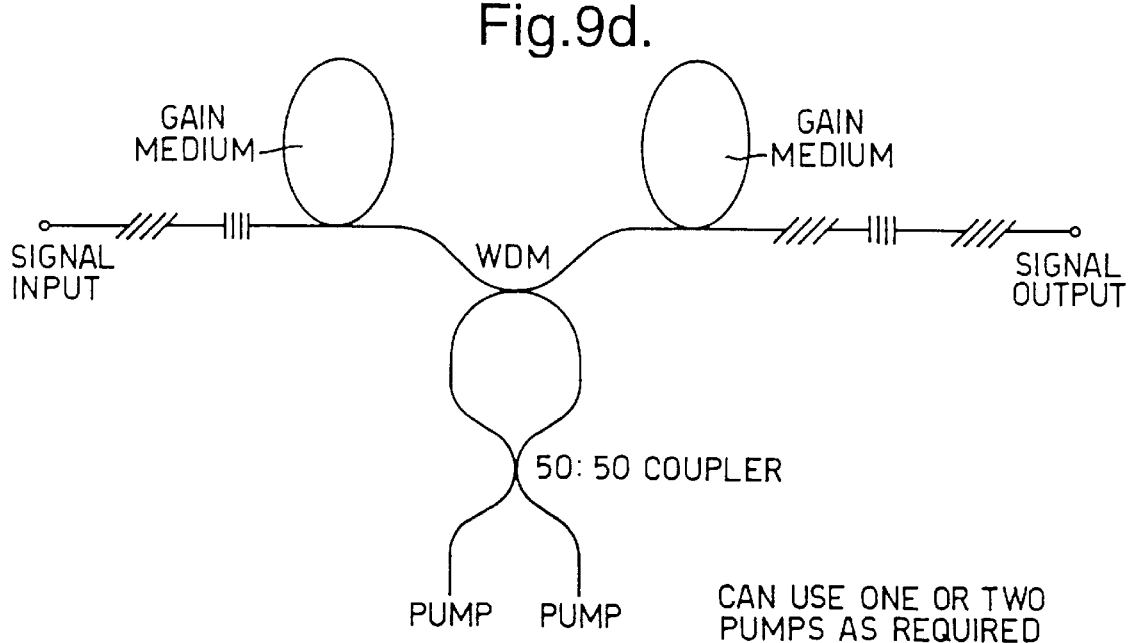
Figure 9E:
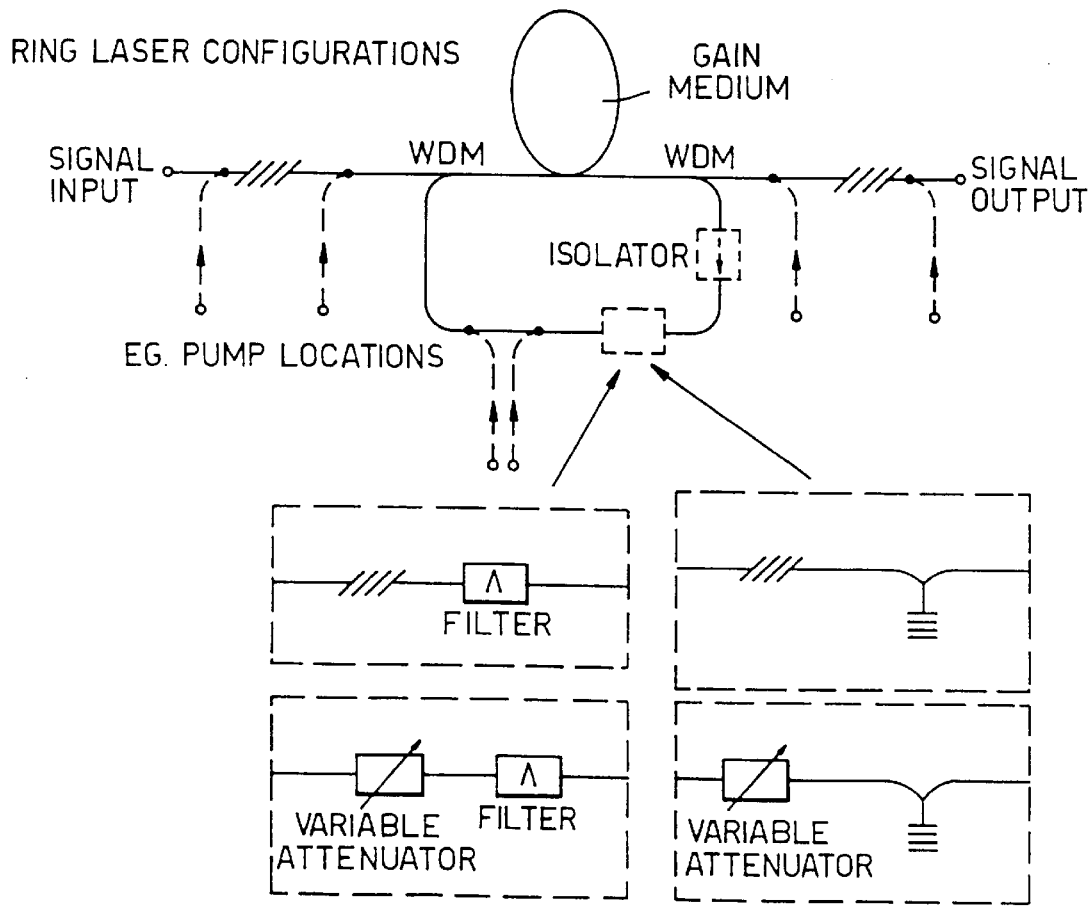

Over a restricted range, it is possible to find one or more laser wavelengths for which, to first order, there is no change in signal gain with laser frequency variation. Imposing $dg_s/d\gamma_l = 0$ results in $$g_S = \sigma_{as} N_t \left[ R \left( \frac{kT}{hZ_{l(v)} \sigma_{al}} \frac{d\sigma_{al}}{dv_l} \right)^{-1} + R - 1 \right] \qquad \text{EQUATION 4}$$

which is plotted in FIG. 7.

The frequency shift with temperature of the gratings used to form the laser cavity is typically 0.01 nm/° C. around 1.5 μm. Therefore a 100° C. temperature shift would shift the wavelength by 1 nm. Qualitatively, from FIG. 6, it can be seen that this shift in lasing wavelength would have a negligible effect on the signal gain if the laser wavelength were chosen using FIG. 7.

Changes in gain due to the temperature dependence of the doped ion cross-sections are small and approximately linear for typical temperature variations around room temperature. The effects of such changes can either be ignored or compensated for by a small shift in the optimum laser wavelength.

Figure 4:
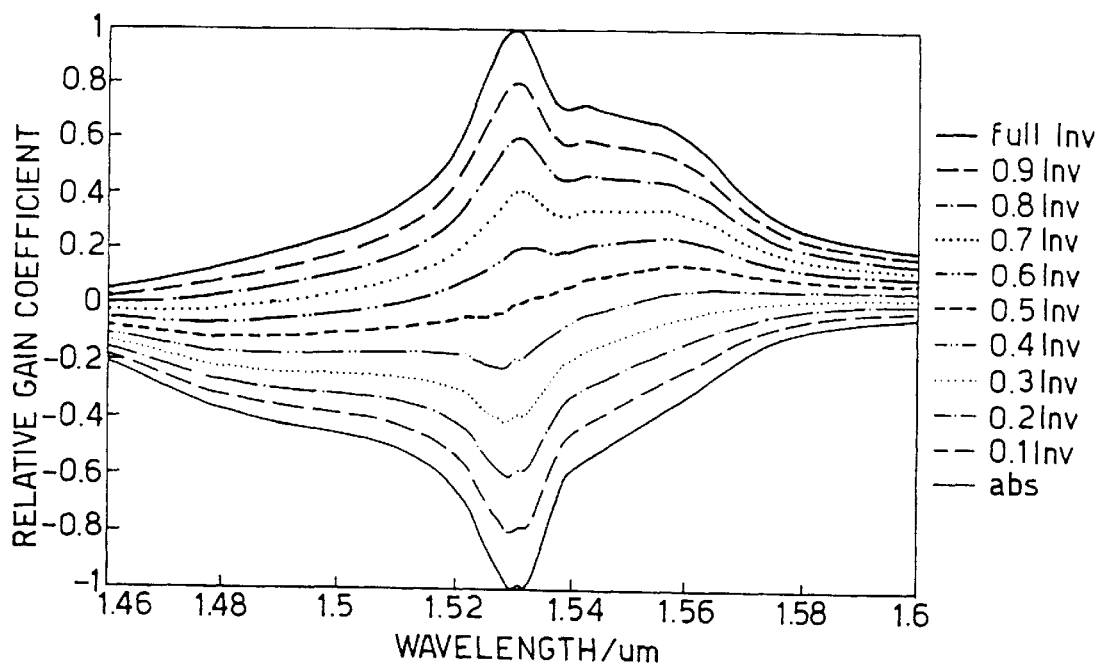
FIG. 4 is a graph representing how relative gain of one example of an erbium doped fibre amplifier varies with lasing wavelength for different values of inversion.

FIG. 4 shows plots of the relative gain coefficients of a typical erbium doped AlGe:silica fibre. They are derived from relative absorption and emission cross-section data in turn normalised from a white light absorption measurement and a side-light (out of the side of the fibre) fully inverted fluorescence spectrum. Between the two extreme curves are plotted the relative gain coefficients for a variety of population inversions.

The curves indicate the relationships between gain at different wavelengths across the band for particular inversions, for example an amplifier operating at a population inversion of 70% and with a relative gain of approximately 0.2 at 1520 nm will have a gain of about 0.35 at 1560 nm.

For a gain controlled amplifier according to the present invention, the lasing wavelength and optical cavity loss determines the level of inversion. If the cavity loss were for instance 0.4 (in the relative units in FIG. 4), then for a laser wavelength of 1532 nm the amplifier would operate at an inversion of 72%, for 1520 nm the inversion would be about 90%, but for wavelengths shorter than 1515 nm or longer than 1570 nm, no lasing would occur because there is not enough gain in the system at such wavelengths to support it.

For a cavity with no loss and a laser wavelength of 1510 nm, the minimum inversion that the amplifier can work at controllably is approximately 60%. The shorter the laser wavelength, the higher this minimum inversion becomes. For instance, if an inversion of 70% were desired, it would be impossible to achieve this with a laser at wavelengths shorter than 1490 nm.

The above behaviour is typical of three-level amplifier behaviour. Four-level gain systems, for example those incorporating praseodymium are not fundamentally limited for zero loss cavities in this way. Because there is no lower laser state absorption, there is always some gain at the laser wavelength. This means that the laser wavelength can be anywhere within the gain band.

The degradation in signal-to-noise ratio at a particular point in a three-level amplifier is determined by the population inversion of the gain medium at that point. This also applies to a four-level laser with parasitic loss mechanisms.

For an amplifier pumped directly into its upper laser level, the maximum population inversion that can be achieved is governed by the wavelength of the pump source, greater inversions being obtainable for shorter wavelength pump fluxes. The presence of a lasing flux at a wavelength longer than that of the pump serves to degrade the signal-to-noise ratio by pulling down the population inversion. It is important to minimise this effect in the design of the gain controlled laser cavity.

The noise performance of an amplifier is dominated by conditions at its input end. By minimising the power level of the laser flux at the amplifier input end, a higher population inversion can be maintained at this point with a consequent improved overall amplifier noise performance. This can be achieved by constructing the laser cavity asymmetrically with its predominant losses located towards the output end of the fibre, resulting in low laser fluxes at the input of the amplifier and high at the output. In this way it is possible to achieve high local inversion at the input end of the amplifier while maintaining a given net inversion across the cavity.

One way of achieving this asymmetry is by incorporating a side-tap grating near the output end of the optical cavity which couples light at a specific laser wavelength out of the fibre core to be dispersed in the fibre cladding. Side-tap gratings may be formed, for example, using the method described in Kashyap et al. referenced above. In the reference, an optical reflection grating is written into a fibre portion by sensitizing the fibre portion to UV light and impressing an interference pattern into the body of the fibre portion using UV light. If the fibre portion is arranged in normal orientation to the interference pattern, a standard optical reflection grating is formed. If the fibre portion is arranged at an angle to the interference pattern, an angled, or side-tap, optical reflection grating is formed.

The side-tap grating at the laser wavelength can be inserted into the laser cavity between the erbium doped amplifier and the second optical grating to determine the cavity loss. In this way, it is possible for the first and second fibre cavity gratings to be two highly-reflecting gratings at the lasing wavelength. The advantage of encompassing the laser within highly-reflecting gratings is that the laser cavity is less sensitive to stray light at the laser wavelength that may be propagating in the surrounding network due, for example, to ASE from other devices or to external reflections. A further advantage is to reduce the effect on the external system from light at the laser wavelength in the laser cavity.

One of the prime advantages of a gain controlled amplifier according to the present invention is that its inversion is uniquely defined and a single passive filter can be constructed to equalise the gain of the amplifier over the bandwidth of the amplifier.

With reference to the example of a grating configuration shown in FIG. 8, if a high reflection grating 26 with a broader reflection bandwidth is used at the input amplifier end, then the laser wavelength is uniquely determined by the reflective wavelength of a narrower reflection bandwidth grating 38 at the output end. A side-tap grating 39 controls the cavity loss and a set of gain-flattening gratings 40 associated with the output end grating 38 control the wavelength spectrum of the signal output from the amplifier. The gain-flattening gratings 40 comprise a plurality of side tap gratings which couple differing amounts of light at differing wavelengths into the fibre cladding, to equalise the amplifier gain spectrum of output light.

It may be useful to be able to reconfigure the amplifier for use at other fixed gains. An effective way of achieving this would be to construct the amplifier so that a gain conversion can be achieved by replacing a single component comprising all the elements of FIG. 8 in a single replaceable unit, the amplifier and the replaceable component including appropriate demountable connectors.

It would be possible to arrange the output grating to be only partially reflecting at the lasing wavelength. This would have the disadvantage, in practice, that a highly efficient attenuator operating at the lasing wavelength would need to be incorporated with the amplifier, outside of the laser cavity, to prevent light at the lasing wavelength escaping from the amplifier into the subsequent optical system.

By placing the first and second optical gratings at the start and end of a group of amplifiers, it would be possible to stabilise them all together. Thus a long distance communication link, of many tens or hundreds of kilometers could incorporate a gain controlled amplifier system comprising a single input and filter assembly and a single output and filter assembly and many separate lengths of amplifying fibre, the amplifying fibres being separated by the distance dictated by the network loss therebetween. Additionally filters could be added in the chain if necessary. Such an arrangement might also find application in passive optical networks (PON), e.g. of the type proposed for local distribution networks. Such distribution systems could be of great importance in WDM systems.

Generally, any modelling of any fibre amplifier to obtain specific information about actual expected gains requires quite detailed knowledge of fibre parameters. This includes the cross-section data for all the wavelengths of interest (pump and signal at least), rare earth ion doping concentration, doping distribution in the fibre core, pump and signal mode distribution in the fibre core and fibre length. This information combined allows a graph to be plotted with curves for the relative gain coefficients (as in FIG. 4), knowing what the scaling factor is to convert this into actual gain. For a conventional amplifier this means for any operating condition, both the amplifier's gain and the inversion that it is at for that gain level is known.

Following from this it is possible to design a gain controlled device. Firstly from the graph (FIG. 4) it is necessary to read off the range of laser wavelengths that can be used to provide the desired signal gain. Knowing the gain and range of wavelengths, it is necessary then to optimise the system with respect to cavity loss. The first stage of the optimisation involves selecting a laser wavelength which is as close to the wavelength where the sum of the absorption and emission cross-sections are a maximum (FIG. 5). In practice, for all rare earth fibre systems, the absorption cross-section peak and the emission cross-section peak are very close and so putting the laser wavelength at either of these is a good approximation. Further to this, if the amplifier is likely to undergo significant temperature variations then the next stage of optimisation involves looking for the appropriate minimum in the signal gain (or equivalently overall inversion) versus laser wavelength (FIG. 7). From FIG. 5 and FIG. 7 it can be seen that such minima exist in the vicinity of the loss optimum and so overall stability can be assured. Furthermore, the fact that changes in the cross-sections with temperature are approximately linear with temperature over typical operation temperature ranges implies that with an additional small wavelength shift, this effect too can be minimised.

A further use for a gain controlled amplifier according to the present invention is use of the amplifier specifically set up to be used in saturation. In a saturated amplifier the output power of the amplified signal is relatively independent of its input value which implies that the gain reduces as the signal increases.

By adding gain control to a saturated amplifier the maximum gain that the amplifier can provide is limited. In normal operation the inversion is determined by the high signal flux and there is no lasing at the laser cavity wavelength. If the input signal level drops, however, the gain control prevents the gain from rising to what could potentially be very high levels in high power amplifiers. This prevents spiking behaviour and avoids problems with unwanted laser oscillations starting up spontaneously at transmission wavelengths due to small reflections from splices, multiplexers and other network elements.

As already indicated, the details given for an erbium doped amplifier are exemplary. Other rare earth dopant species can be used for other wavelength ranges of operation. Praseodymium is one example.

Unlike erbium, praseodymium has a four-level lasing system which is able to support a population inversion anywhere within the 1300 nm transition bandwidth. Thus, there is no limit to the lasing wavelength within the 1300 nm transition. Also, the gain spectrum for praseodymium is very symmetrical which means that the wavelength region around the peak of the sum of the absorption and emission cross-sections (which in the case of praseodymium is equivalent to the peak of the emission cross-section) will typically be occupied by signals. Although the lasing wavelength for a praseodymium-doped amplifier can be anywhere in the range 1250 nm to 1350 nm, the optimum lasing wavelength is around 1275 nm to avoid possible ground state absorption (GSA) effects which tend to occur at longer wavelengths.

Although, it is not possible to place the lasing wavelength of a praseodymium-doped amplifier at the peak of the sum of the absorption and emission cross-sections, the advantages in having the laser wavelength as close to the peak as possible to give better control remain.

A suitable optical fibre host for a praseodymium-doped amplifier is a fluoride fibre, for example a ZBLAN fibre or a ZHBLAYLiNP (for high numerical aperture fibres) fibre, doped to between 500 to 2000 ppm (by weight). A suitable ZHBLAYLiNP composition [Zr:Hf:Ba:La:Y:Al:Na:Li:Pb] for the core (in mol %) is [15:0:19:3.7:3:2.3:0:14:7], and for the cladding (in mol %) is [8.7:39.3:19:2.5:2:4.5:24:0:0]. A suitable pump source for the fibre is a Nd:YLF laser driven at around 700 mW, which provides light at around 1047 nm, this being well within the praseodymium pump wavelength band of 950 nm to 1070 nm.

FIGS. 9a to 9e illustrate further alternative configurations of the present invention, the advantages of which are self-evident. It should be noted that broken lines in these Figures signify optional arrangements.

The applicants have determined that generally some dopant species, for example erbium, have a peak of the sum of their absorption and emission cross-sections which does not coincide with a desirable signal transmission window wavelength, and in such circumstances the resonance wavelength can be placed at the peak for optimum gain stabilisation. Other dopant species, for example praseodymium, have a peak of the sum of their absorption and emission cross-sections substantially coincident with a desirable signal transmission window. Thus, these dopant species require that the resonant wavelength of an amplifier be placed, not at the peak but as near to the peak as possible.

The amount of separation between signal and resonance wavelengths depends to a large extent on the ability of the cavity of an amplifier to distinguish between the wavelengths, or the achievable wavelength selectivity of the reflectors, wavelength selective filters or couplers which define the cavity resonance wavelength and signal input and output means. Typically, wavelength selective elements, for example optical gratings, can distinguish between wavelengths as close as 5 nm apart. Therefore, if one wavelength is placed at the peak, the other can be placed as close as 5 nm away. However, wavelength selective elements have been shown to be capable of distinguishing between wavelengths up to 1 nm apart.

Obviously, for WDM systems in which the signal may comprise a plurality of wavelength components all having wavelengths different from that of the resonant wavelength, it would be the wavelength component closest to that of the resonant wavelength to which the above restrictions would apply.

REFERENCES

1. Rare earth doped fluorozirconate glasses for fibre devices, S. T. Davey & P. W. France, BT Technology Journal, Vol 7, No 1, January 1989.

What is claimed is:

1. An optical amplifier comprising:
a resonant optical cavity resonant at a first wavelength, the cavity incorporating a gain medium comprising an optical fibre host including a rare earth dopant species;
a first coupling arrangement to couple one or more optical signals to be amplified into an input of the optical cavity, the or each optical signal having a wavelength different from the first wavelength;
a second coupling arrangement to couple the optical signal(s), after amplification, from an output of the optical cavity; and
an optical pump source optically coupled to the optical cavity to supply optical pump energy to the optical cavity to form, in use, a net population inversion in the rare earth doped fibre host, wherein the optical cavity is arranged such that said net population inversion is non-uniformly distributed across said cavity from a first local inversion level at the input of the cavity to a second local inversion level at the output thereof, said first local inversion level being higher than said second local inversion level.

2. An optical amplifier as in claim 1 in which the population inversion distribution is significantly asymmetric because the optical cavity includes, towards the output of the cavity, at least one side-tap grating which provides greater loss at the first wavelength than at the signal wavelength(s).

3. An optical amplifier as in claim 1 wherein the optical cavity is defined by first and second optical gratings which have their highest reflectivity at the first wavelength.

4. An optical amplifier as in claim 1 wherein the first wavelength is substantially equal to the wavelength of the peak of the sum of the absorption and emission cross sections of the dopant species.

5. An optical amplifier as in claim 1 the amplifier including wavelength selective elements, wherein the dopant species comprises praseodymium in a fluoride host, and in use one of the signal wavelengths is substantially equal to the wavelength of the peak of the sum of the absorption and emission cross sections of the dopant species, the first wavelength is between 1250 and 1350 nm and the signal wavelengths are sufficiently distant from the first wavelength to be distinguishable therefrom by the wavelength selective elements of the amplifier.

6. An optical amplifier comprising:
an optical cavity defined by first and second reflectors, the optical cavity incorporating a gain medium comprising an optical fibre host including a rare earth dopant species and being tuned for resonance at a first wavelength;
a first coupling arrangement to couple an optical signal into the cavity at a second wavelength different from the first wavelength;
a second coupling arrangement to couple the optical signal, after amplification, from the cavity; and
an optical source optically coupled to the optical cavity to optically pump the gain medium to provide a population inversion,
wherein the optical cavity is arranged to provide an asymmetric laser flux distribution along its length, and in that the first wavelength is substantially equal to the wavelength of the peak of the sum of the absorption and emission cross-sections of the dopant species.

7. An optical amplifier as in claim 6 wherein, in use, the population inversion in the cavity decreases along the length of the cavity from the first reflector towards the second reflector.

8. An optical amplifier as in claim 6 comprising erbium as the dopant species, wherein the first wavelength is in the range 1510 nm to 1560 nm inclusive.

9. An optical amplifier as in claim 8 wherein the fibre host for the erbium dopant is an Al/Ge silica fibre, and wherein the first wavelength is between 1.52 and 1.55 microns.

10. An optical amplifier as in claim 8, in which the pump source provides light at a wavelength of substantially 1480 nm.

11. An optical amplifier as in claim 6 wherein the optical fibre host comprises predominantly praseodymium-doped fluoride fibre.

12. An optical amplifier as in claim 11 wherein the first wavelength is between 1250 nm and 1350 nm.

13. An optical amplifier as in claim 12 wherein the first wavelength is arranged to be at least 5 nm from said peak.

14. An optical amplifier as in claim 6 in which the optical amplifier includes at least one side tap grating which provides significantly more loss at the first wavelength than at the second wavelength.

15. An optical amplifier as in claim 6 in which the second reflector has its highest reflectivity at the first wavelength.

16. An optical amplifier as in claim 1 further comprising a gain flattening optical grating arrangement.

17. An optical amplifier according to claim 6 further comprising a gain flattening optical grating arrangement.

18. An optical amplifier comprising:
an optical cavity, the optical cavity being defined by first and second reflectors and being tuned for resonance at a first wavelength, the first reflector being a broadband reflector reflective at said first wavelength and the second reflector being a narrowband reflector reflective at said first wavelength;
an optical fibre gain medium incorporating a rare-earth dopant species being provided in an optical path of the optical cavity;
an input port for coupling an optical input signal at a second wavelength different from the first wavelength into the optical cavity;
an output port via which the amplified input signal exits said cavity; and
an optical source to pump the gain medium to produce a net population inversion therein which supports steady-state lasing, where in the optical cavity is arranged such that said net population inversion is distributed across said cavity from a first local inversion level at the input port of the cavity to a second local inversion level at the output port thereof, said first level being higher than said second level, and in that said first wavelength is arranged to be substantially at the peak of the sum of the absorption and emission cross-sections of the dopant species.

19. An optical amplifier as in claim 18 wherein the output port includes said second reflector, the second reflector having a lower reflectivity at the second wavelength than at said first wavelength.

20. An optical amplifier as in claim 18 wherein the second reflector has a reflectivity of at least 90% at the first wavelength.

21. An optical amplifier as in claim 18 wherein the amplifier includes an arrangement downstream of said second reflector to provide a significant transmission loss at the first wavelength without significant transmission loss at the second wavelength.

22. A method of amplifying an optical signal using an optical fibre amplifier, the method comprising the steps of:

pumping an optical fibre host which includes a rare earth dopant species and which is incorporated into an optical cavity which is tuned for resonance at a first wavelength, to produce a population inversion;

coupling the optical signal at a second wavelength into the input end of the cavity; and coupling the amplified optical signal from the output end of the optical cavity, wherein the population inversion is asymmetric and falls from a first level to a lower second level from the input of the cavity towards the output of the cavity.

23. A method of providing gain stabilized amplification of wavelength division multiplexed optical signals in a communications network which comprises:

coupling the wavelength division multiplexed signals from an optical fibre of the communications network into the input of a rare earth doped optical fibre amplifier which includes an optical cavity which is resonant at a first wavelength different from the wavelengths of any of the optical signals; and coupling the amplified optical signals out of the output of the amplifier into a further optical fibre of the communications network, wherein the optical cavity in use has an asymmetric population inversion distribution along the cavity, the distribution falling from a higher level at the amplifier input to a lower level at the amplifier output.

24. A method as in claim 22 wherein the first wavelength is substantially equal to the wavelength of the peak of the sum of the absorption and emission cross sections of the dopant species.

25. A method as in claim 22 wherein the rare earth dopant species is praseodymium in a fluoride fibre host.

26. A method as in claim 23 wherein the rare earth dopant is erbium.

* * * * *